Sept. 4, 1962 N. N. HOCHGRAF ETAL 3,052,665
POLYMERIZATION DILUENT FRACTIONATION
Filed Oct. 10, 1958
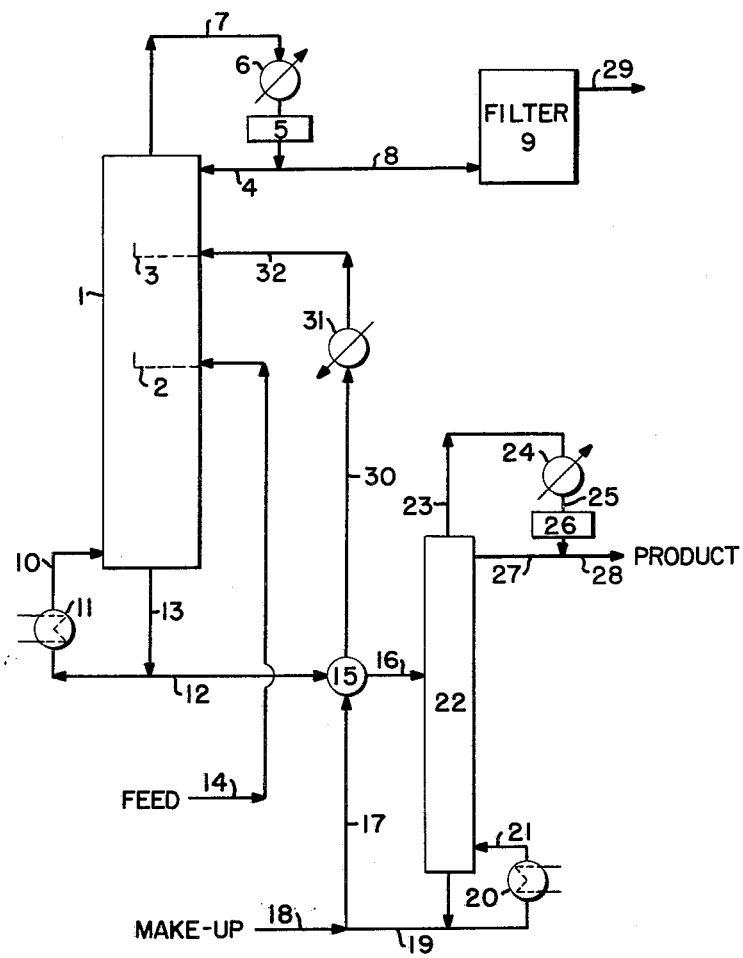
Norman N. Hochgraf
Ralph H. Schatz  Inventors
Bruce R. Tegge
By *L. Chasan* Attorney 3,052,665
POLYMERIZATION DILUENT FRACTIONATION
Norman N. Hochgraf, Basking Ridge, Ralph H. Schatz, Westfield, and Bruce R. Tegge, Madison, N.J., assignors to Esso Research and Engineering Company, a corporation of Delaware
Filed Oct. 10, 1958, Ser. No. 766,556
6 Claims. (Cl. 260—93.7)

This invention relates to an improved method of obtaining more satisfactory polymer products from the low pressure polymerization of alpha olefins. More particularly it relates to a process for obtaining products of improved odor characteristics in systems employing aromatics as polymerization diluents.

The low pressure polymerization and copolymerization of alpha olefins and diolefins with catalyst systems made up of a partially reduced, heavy, transition metal halide and a reducing metal-containing compound to high density, often isotactic, high molecular weight, solid, relatively linear products has been assuming ever increasing importance and is now well known.

For the purpose of convenience details of the low pressure catalytic process and the products obtained thereby are presented below, although it should be realized that these by themselves constitute no part of this invention.

The alpha olefinic feeds utilized in polymerization and copolymerization include $C_2$-$C_6$, e.g. ethylene, propylene, butene-1, hexene-1, etc. with ethylene and propylene preferred.

The process is described in the literature, e.g. see Belgian Patent 538,782, and "Scientific American," September 1957, pages 98 et seq.

In the process the polymers are prepared by polymerizing the constituent monomers in the desired proportions with the aid of certain polymerization catalysts, e.g. see above-mentioned Belgian patent. The catalysts are solid, insoluble, reaction products obtained by partially reducing a reducible, heavy, transition halide of a group IV$b$ to VI$b$ or VIII metal with a reducing group I and III metal-containing material such as an organometallic compound of an alkali, alkaline earth, rare earth metal or zinc. They can also be advantageously prepared by reducing an appropriate metal compound with the aid of metallic aluminum or a mixture of aluminum and titanium, etc. A catalyst of this type can thus be prepared by reducing 1 mole of titanium tetrahalide, usually tetrachloride, to the corresponding trivalent or sub-trivalent titanium halide with about 0.2 to 6 moles of aluminum triethyl, triisobutyl or other aluminum alkyl compound of the formula $RR'AlX$. In this formula R, R', and X may alternatively be hydrogen or a halogen, notably chlorine. The reduction is carried out by dissolving each of the two catalyst components in an inert solvent, preferably a $C_3$ to $C_{18}$ paraffin such as isopentane or n-heptane, and mixing the two solutions in the proper proportions at temperatures between 0° and 150° C. and in the absence of moisture, oxygen and sulfur impurities. The resulting precipitate in conjunction with some free aluminum alkyl compound is generally considered to constitute the actual active polymerization catalyst. Alternatively, it is possible to carry out the catalyst preparation using only about 0.3 to 0.8 mole of the aluminum alkyl compound per mole of titanium chloride, and then add a supplemental amount of the aluminum alkyl compound to the polymerization zone to raise the Al/Ti mole ratio therein to a value between about 1:1 and 3:1.

The monomers are then contacted with the resulting catalyst in the presence of an inert aromatic hydrocarbon solvent. The aromatics that have been shown to be particularly useful for this purpose include benzene, toluene and xylene.

The polymerization is conveniently effected at temperatures of about 50° to 100° C. and pressures ranging from about 0 to 500 p.s.i.g., usually 0 to 100 p.s.i.g. The catalyst concentration in the polymerization zone is preferably in the range of about 0.03 to 0.5 wt. percent based on total liquid and the polymer product concentration in the polymerization zone is preferably kept between about 5 to 15 wt. percent based on total contents so as to allow easy handling of the polymerized mixture. The proper polymer concentration can be obtained by having enough of the inert diluent present or by controlling the polymerization short of 100% conversion.

When the desired degree of polymerization has been reached, a $C_1$ to $C_3$ alkanol such as methyl alcohol, ethanol or isopropyl alcohol is normally added to the reaction mixture for the purpose of partially dissolving and deactivating the catalyst and for precipitating the dissolved portion of the polymer product from solution. The resultant alkanol-aromatic mixture is separated from the precipitated polymer by conventional means such as filtration or centrifuging. Since the polymer product requires additional washing, the resultant alkanol-aromatic filtrate is fractionated and the predominantly alcohol stream is used again to wash the polymer cake which is then dried. The alkanol-aromatic filtrate to be separated usually has an alcohol to aromatic weight ratio in the range of 0.2 to 1.5/1.

The polymers produced have number average molecular weight in the range of about 100,000 to 300,000 or even as high as 3,000,000 as determined by the intrinsic viscosity method using the I. Harris correlation (J. Polymer Science, 8 361, 1952). The polymers can have a high degree of crystallinity and a low solubility in n-heptane.

It is to be understood that the term "low pressure" polymer as used herein connotes material prepared in the indicated manner and includes homo- and copolymers.

The polymer product obtained has in many cases been characterized by an undesirable odor. With inhibited non-oxidized polymers this odor arises from small amounts of retained aromatics, e.g. xylene. The distillation to fractionate the alkanol-aromatic mixture separated from the precipitate gives an alkanol stream containing appreciable quantities of aromatics because of azeotrope formation particularly in the case of benzene and toluene. The use of the aromatic-containing alkanol in the washing step results in a minimum aromatic content in the liquid on the polymer of about 5 to 10 wt. percent in the case of xylene. The retained aromatic is difficult to remove in the subsequent drying operation.

This invention provides an improved integrated method of overcoming these difficulties. The method comprises fractionating the aromatic-alkanol filtrate liquid, separated from the precipitated polymers, in the presence of a small amount of added aromatic hydrocarbon, higher boiling than the aromatic polymerization diluent. The added aromatic hydrocarbon is thus a $C_9$ or $C_{10}$ aromatic. Specific examples are listed below. An alkanol of considerably reduced aromatic content is thereby obtained. This alkanol stream is relatively aromatic free. This alkanol is employed for washing the polymer product in the filtration step. The alkanol stream used for washing thus contains a maximum of about 1 wt. percent aromatic. When this is used in washing the polymer the maximum aromatic content of the retained liquid in the polymer cake is about 1.0 wt. percent and usually less. The latter feature in turn provides a substantially odor-free product.

It is especially surprising to find these improved results with the small quantities of higher boiling aromatic hydrocarbons added to the alkanol-aromatic fractionation tower. The amount is insufficient to require any substantial increase in fractionation facilities. The amount of higher boiling aromatic employed is also much smaller than conventionally used in extractive distillation.

The added aromatic hydrocarbons employed are used in an amount equivalent to 5 to 45 mol percent based on the total liquid on the added aromatic feed plate in the alkanol-aromatic fractionation tower.

Suitable added aromatic hydrocarbons that can be used include materials such as durene, cumene, pseudocumene, hemimellitene, isopropyl benzene, methyl ethyl benzenes, isodurene, naphthalene, prehnitene, mesitylene, butyl benzenes, p-cymene or alkylated benzenes or mixtures thereof. The added hydrocarbon is introduced as a liquid near the top of the distillation zone, e.g. about 5 plates below the top of the tower but substantially above the point of introduction of the alkanol-aromatic feed mixture.

This invention will be better understood by reference to the flow diagram and the following examples.

In the drawing 1 represents the fractionation tower for separating an e.g. methanol-xylene mixture filtrate solution separated from the polymer product. A methanol-xylene mixture containing 810 lbs. per hour of methanol and 964 lbs. per hour of xylene (for a weight ratio of 0.85 to 1) is fed through line 14 into tower 1 at the fortieth plate below the top of the tower 2. Simultaneously the added aromatic hydrocarbon, e.g. 366 lbs. per hour of $C_{10}$ aromatics, is fed through line 32 into tower 1, five plates below the top of the tower. The overhead vapor through line 7, comprising 1620 lbs. per hour methanol and 10 lbs. per hour of xylene, flows into condenser 6 and reflux drum 5. The reflux stream of 810 lbs. per hour of methanol and 5 lbs. per hour of xylene is pumped back into the top of the tower through line 4. This results in a liquid composition on the fifth plate in tower 3 of 10 mol percent added $C_{10}$ aromatics and 90 mol percent methanol with only traces of xylene. The tower is operated at a pressure of 50 p.s.i.g. which corresponds to an overhead temperature of 226° F. and a bottoms temperature of 420° F. The bottoms from tower 1 taken off through line 13 are partially vaporized in reboiler 11 and the vapors returned to the tower through line 10. The remainder of the bottoms, i.e. 959 lbs. per hour of xylene, and 366 lbs. per hour of $C_{10}$ aromatics are fed through line 12 through heat exchanger 15 and line 16 into the xylene-added aromatics splitter tower 22.

This tower fractionates the xylene polymerization diluent from the added $C_{10}$ aromatics. Tower 22 is operated at a pressure of 5 p.s.i.g. and an overhead temperature of 300° F. and a bottoms temperature of 395° F. Part of the tower bottoms are sent through line 19 into reboiler 20 through line 21 so that the vapors are returned to tower 22. The remaining bottoms stream consisting of 366 lbs. per hour of $C_{10}$ aromatics and 4 lbs. per hour of xylene flows through line 17 into heat exchanger 15, line 30 and cooler 31 into line 32, as previously described. Any losses of added $C_{10}$ aromatics are compensated through makeup line 18.

The overhead vapors from tower 22 amounting to 1720 lbs. per hour flow through line 23 into condenser 24 through line 25 into reflux drum 26. The reflux stream through line 27 amounts to 765 lbs. per hour of xylene. The remainder, 955 lbs. per hour of xylene, is withdrawn through line 28 and is returned as polymerization diluent to the polymerization reactors as desired.

The purified methanol from tower 1 is withdrawn from reflux drum 5 through line 8. This overhead stream contains 810 lbs. per hour of methanol and 5 lbs. per hour of xylene. This alcohol stream is used to wash the polymer filter cake shown in schematic form in the product filter cake-washing operation shown in block form at 9. Excess washing liquid is withdrawn as filtrate through line 29 and can be returned to tower 2 through line 14, as previously described. The polymer cake washed as taught herein thus contains 99.4 wt. percent methanol and only 0.6 wt. percent xylene in the retained liquid in the polymer cake. When the xylene-containing alcohol stream is not fractionated as taught herein and is used directly in washing the filter cake in 9, the xylene content of the liquid contained in the cake is about 6 wt. percent xylene for the same size column and reflux ratio. Thus the addition of only a small amount of added $C_{10}$ aromatics markedly reduces the amount of xylene retained in the polymer cake liquid. This marked reduction in xylene content substantially eliminates the odor problem.

It is possible to combine the methanol-xylene distillation column 2 and the xylene-third component splitter column 22 by adding zone 3 to zones 1 and 2, and to take the methanol-free xylene product as a vapor side stream from this combination column. If the xylene product is taken as a vapor sidestream, small amounts of the third-component will be present. However, the presence of the third-component in the xylene polymerization diluent is in no way deleterious to the polymerization process.

The advantages of this invention will be apparent to the skilled in the art. Polymer products of improved odor and purity are obtained with little, if any, increase in cost. The drying operation is also simplified because of lowered aromatic content in the polymer cake liquid.

It is to be understood that this invention is not limited to the specific examples which have been offered merely as illustrations and that modifications may be made without departing from the spirit of the invention.

What is claimed is:

1. In a process for polymerizing a $C_2$–$C_6$ alpha olefin in the presence of a catalyst containing a partially reduced, heavy, transition metal halide and a metal alkyl compound and an aromatic hydrocarbon diluent selected from the group consisting of benzene, toluene and xylene, wherein a $C_1$ to $C_3$ alkanol lower boiling than the aromatic diluent is added to the reaction system to precipitate polymer product, followed by separation of the resultant diluent-alkanol mixture having an alkanol to aromatic weight ratio in the range of 0.2–1.5/1 therefrom, the improved integrated operation which comprises fractionating the aromatic diluent-alkanol mixture in a fractionation zone in the presence of a small amount of added higher boiling aromatic hydrocarbon selected from the group consisting of $C_9$ and $C_{10}$ aromatics, the added aromatic being introduced near the top of the fractionation zone above the point of introduction of the diluent-alkanol mixture and being utilized in an amount equivalent to 5 to 45 mol percent based on the total liquid on the added aromatic feed plate in the fractionation zone to obtain a relatively aromatic-free alkanol stream and utilizing this alkanol stream to wash the precipitated polymer product.

2. The process of claim 1 in which the relatively aromatic-free alkanol stream contains a maximum of about 1 wt. percent aromatics.

3. The process of claim 1 in which the alkanol utilized is methanol.

4. The process of claim 1 in which the aromatic diluent is benzene.

5. The process of claim 3 in which the aromatic diluent is xylene.

6. The process of claim 5 in which the added aromatic is a $C_{10}$ aromatic.

References Cited in the file of this patent

UNITED STATES PATENTS

| | | |
|---|---|---|
| 2,107,265 | Archibald | Feb. 8, 1938 |
| 2,537,115 | Scheibel | Jan. 9, 1951 |
| 2,552,412 | Drout et al. | May 8, 1951 |
| 2,575,284 | Morrell | Nov. 13, 1951 |
| 2,910,461 | Nowlin | Oct. 27, 1959 |